United States Patent

Bourne

[15] 3,648,442
[45] Mar. 14, 1972

[54] DUST COLLECTORS

[72] Inventor: Ronald F. Bourne, Johannesburg, South Africa

[73] Assignee: The Asbestos Grading Equipment Company (South Africa) (Proprietary) Limited, Selby, Johannesburg, Transvaal, South Africa

[22] Filed: May 20, 1970

[21] Appl. No.: 39,041

[30] Foreign Application Priority Data

May 30, 1969 South Africa.........................69/3882

[52] U.S. Cl......................................55/294, 55/302, 55/341
[51] Int. Cl.................B01d 41/00, B01d 45/18, B01d 46/04
[58] Field of Search...........................55/302, 303, 294, 341

[56] References Cited

UNITED STATES PATENTS

| 3,480,330 | 11/1969 | Hirs et al.............................55/302 X |
| 3,243,940 | 4/1966 | Larson................................55/302 X |
| 3,543,481 | 8/1967 | Pausch..................................55/302 |
| 3,487,609 | 1/1970 | Caplan..................................55/294 |

Primary Examiner—Howard R. Caine
Attorney—Waters, Roditi, Schwartz & Nissen

[57] ABSTRACT

Air air filter is provided in which dust laden air is passed through a plurality of filtering bags and from which the trapped dust is dislodged by reversing the flow of air through the bag walls sequentially. The trapped dust which falls under the influence of gravity onto the floor of the filter is swept towards an exhaust port and suitably discharged.

8 Claims, 4 Drawing Figures

DUST COLLECTORS

THIS invention relates to dust collectors and an object of the invention is the provision of a device which the applicant believes will have useful advantages over known arrangements of a similar character.

According to the present invention a dust collecting device includes a casing defining a chamber for a series of dust trapping bags arranged in at least one circle in hanging relationship around a central shaft, mouths uppermost, a dividing wall apertured to accommodate and locate the bag mouths and dividing the chamber into a cleansing section and a reservoir zone for cleansed air passing through the bags, a floor to the cleansing section substantially perpendicularly disposed relative to the shaft, at least one exhaust communicating with the floor, an inlet for dust laden air to enter the cleansing section of the chamber, an outlet for cleansed air to leave the reservoir zone, a sweeper mechanism the arm or arms of which sweep over the floor as the shaft is rotated to urge the dust on the floor towards the exhaust port, and a blower unit at least portion of which is rotatable in the reservoir to reverse the flow of air through the bag walls sequentially, thereby to dislodge trapped dust for gravitational movement towards the floor.

Further according to the invention the blower unit includes an element defining air outlet ports for leading air sequentially into the bags. In one form of the invention the element is a manifold arm projecting from a housing mounted on the shaft and rotatable therewith, the housing accommodating an independently driven blower which acts to draw supplies of air from the reservoir zone. Preferably the blower is driven by a motor anchored to a cap or roof for the reservoir zone. An alternative arrangement is one in which the element is of a turntable form mounted for rotation on the shaft and which together with a stationary hood defines a receiver for air delivered by a blower, the turn-table defining ports for air to pass into the bags.

In order to illustrate the invention two embodiments are described hereunder with reference to he accompanying drawings in which FIG. 1 is a vertical perspective of one form of the device with parts broken away;

Figure 1:
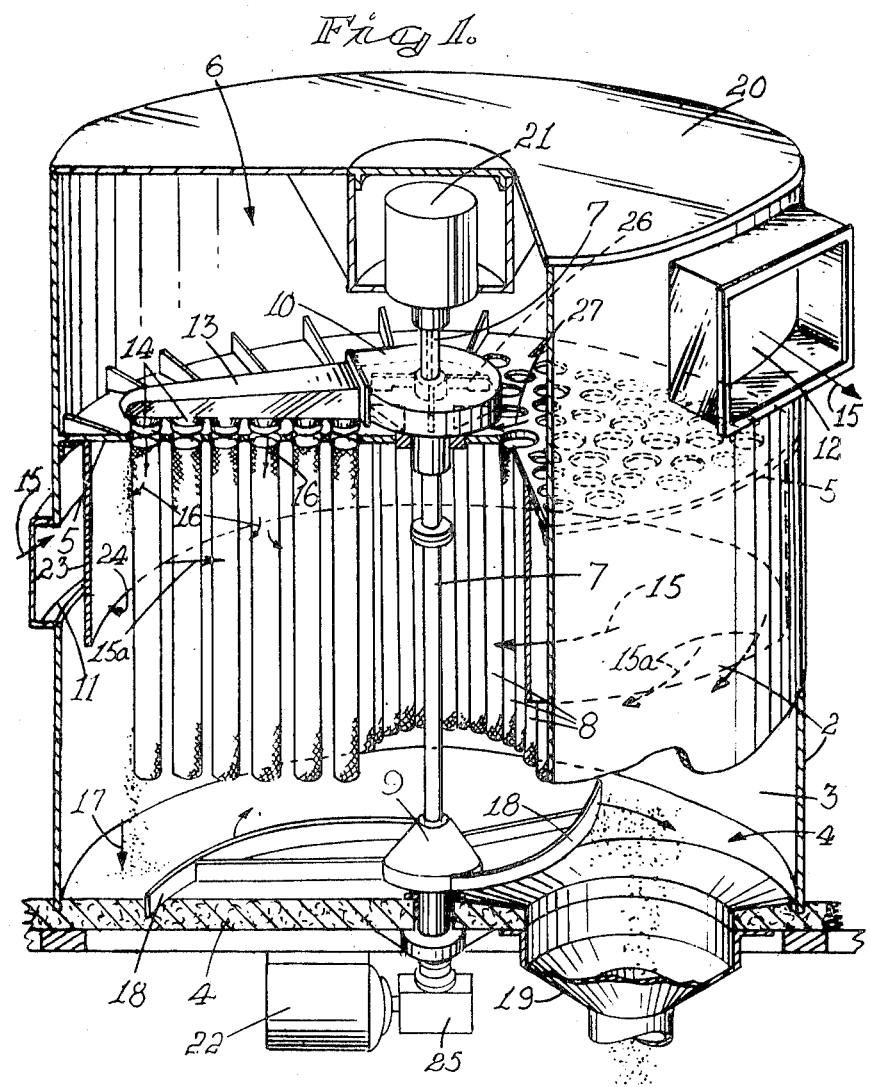

Referring to FIG. 1, the dust collector, by which term the applicant includes devices intended as air filters or cleaners, includes a casing 2 which defines a chamber 3, a floor 4, a dividing wall or ceiling 5, a reservoir zone 6, a central rotatable shaft 7, a series of dust trapping bags 8, a floor sweeping mechanism or spider 9 fast with the shaft and rotatable therewith and a blower unit 10.

Dust laden air enters the chamber tangentially through inlet 11, passes in a circular and downward motion between the casing and the skirt 23 which depends downwardly from dividing wall 5, and then moves in the direction of arrows 15a into the zone of the throat formed by the peripheral lip 24 of skirt 23 before passing through the bag walls. On passing through the bag walls the clean air enters the reservoir 6 from whence it is withdrawn through outlet 12. In passing through the bag walls, dust particles are deposited thereon which are subsequently removed through the agency of the blower unit. In the example under discussion the bags 8 are arranged in concentric circles and the blower unit is provided with a manifold arm 13 fitted with radially spaced nozzles 14 adapted sequentially to deliver counter currents of air to the bags as the arm sweeps over the wall 5. In the drawing the main air stream is shown by the large arrows 15, 15a while air from the blower follows the path of the smaller arrows 16. When a bag is subjected to a jet of air from the blower the flow of air through the bag is reversed but only to the extent that dust adhering to the outer surfaces of the bags is dislodged to fall gently in the direction of arrows 17 to the chamber floor 4. In time particles of dust descending onto the floor are urged by the sweeper arms 18 of the spider 9 towards the exhaust port 19 in the floor from whence the dust is carried away to a suitable dumping area preferably via an air lock valve.

The unit described above should operate satisfactorily on a continuous basis with only small service periods being required. In the arrangement shown in the illustration of FIG. 1 the shaft 7 is rotated at a slow speed, often as low as 0.5 r.p.m., by suitable motor means 22 located beneath the device through gear box unit 25. The shaft projects upwardly drivingly to engage the blower unit 10 so that the blower unit is caused to rotate at the same speed as the spider 9. Within the blower unit there is a blower or fan 26 operated through the agency of a second motor 21 which for convenience of illustration is shown located on the under side of a removable cap or top 20 for the reservoir. Blower speeds of a high order are envisaged and air is drawn into the unit from the reservoir in the direction of arrows 27 for subsequent movement along the arm 10 to the nozzles 14. If desired the motor 21 could be positioned outside the device above the cap but this would act to increase the overall height of the collector.

Dividing wall 5 is perforated as shown in concentric circles and each orifice in the wall or plate 5 accommodates a mouth of a bag with the bag threaded over a suitable cage-like framework (not shown) so as to maintain the bags in an open state. To avoid turbulence at the mouth zones of the bags the nozzles 14 are preferably equipped with resilient skirts 28 which slide over the wall 5 in engagement therewith. Air in the counter streams is thus substantially confined to movement in the direction of arrows 16 and not over the top of wall 5.

Figure 3:
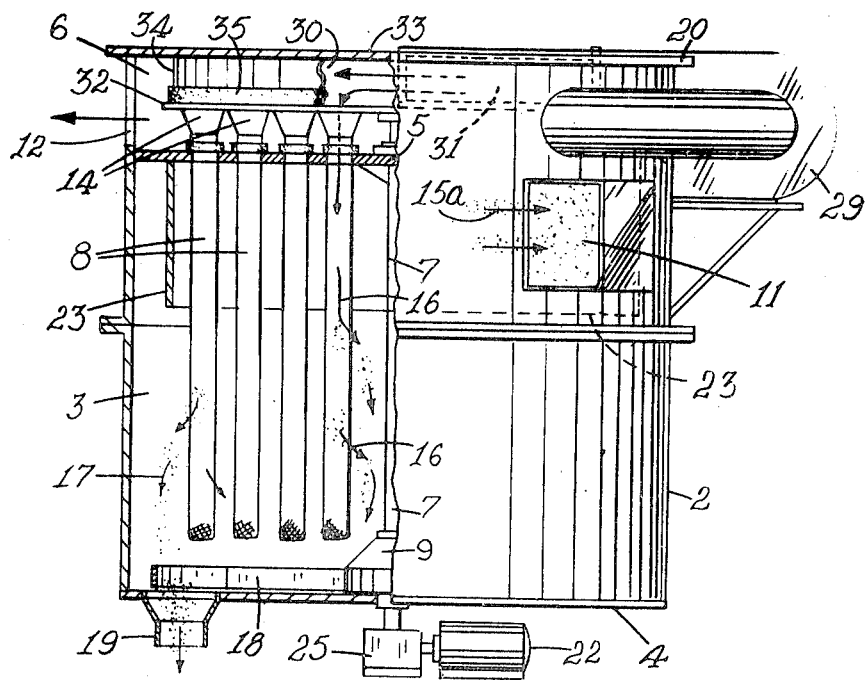
FIG. 3 is an elevation of a second form of the invention with parts broken away.
Figure 4:
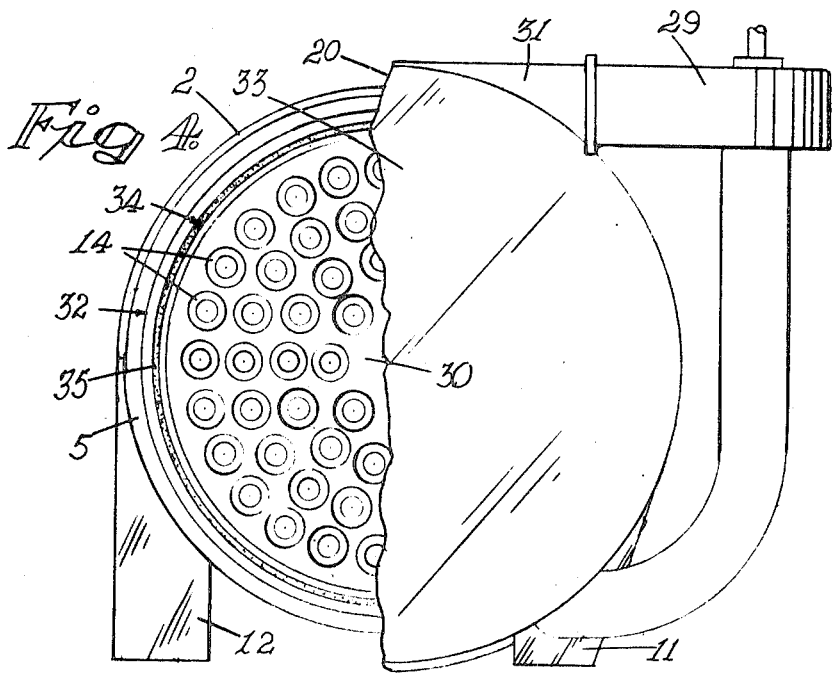
FIG. 4 is a plan of the device of FIG. 2 again with parts broken away.

In the arrangement of FIG. 3 the collector is substantially the same as that shown in FIG. 1 save for a better utilization of the space in the chamber 3 in the second embodiment. In the arrangement of the invention illustrated in FIG. 1 the blower unit required the use of a casing or housing for the fan or blower which occupied a central location in the reservoir. In the nature of things the space directly below the blower housing in the chamber could not easily be occupied by filter bags so that this space serves no useful purpose in the operation of the device. The collector of FIG. 3 is arranged so that more of this central chamber region may be used. In this example of the invention the blower unit comprises a blower and associated motor 29 located on the outside of the casing 2 and a receiver 30 centrally situated in the reservoir zone, the blower being joined to the receiver by suitable ducting 31 with the blower receiving its air supply from the interior of the reservoir. The receiver comprises a turn-table or base plate 32 which is fast with the drive shaft 7 and is rotatable therewith and a hood 33 the side walls 34 of which are fitted with a resilient sealing lip 35 for preventing undue leakage of air from the receiver. In this example it will be noted that the reservoir cap 20 actually constitutes part of the hood by having the side walls 34 downwardly depending from its underside.

Figure 2:
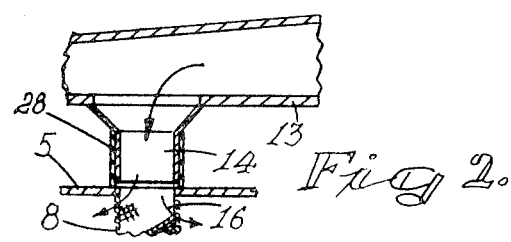
FIG. 2 is a view of the blower manifold arm used in the arrangement of FIG. 1 with parts broken away.

Turn-table 32 is provided with nozzles 14 of a form substantially the same as those shown in FIG. 2 but in this case the nozzles are able to extend radially inwardly up to a zone close to the shaft 7 thereby enabling greater use to be made of the space in the chamber.

A substantial advantage of the collector of the invention is the comparatively low overall height of the device and that variations in the volume of air handled can be tackled merely on the basis of varying the diameter of the device without changing the entrainment velocity of the dust laden air. By entrainment velocity is meant the velocity in which the dust laden air rises up inside the skirt 23.

It will be appreciated that the word "spider" is used in the specification to describe a mechanism which is secured to a shaft and which on rotation of the shaft acts to urge material on an underlying floor towards the draw-off point or exhaust port. Generally a spider will be characterised in numerous arms but in this case a single arm or leg is included within the meaning of the word.

I claim:

1. A dust collecting device including a casing defining a chamber for a series of dust trapping bags arranged in at least one circle in hanging relationship around a central shaft, mouths uppermost, a dividing wall apertured to accommodate and locate the bag mouths and dividing the chamber into a cleansing section and a reservoir zone for cleansed air passing through the bags, a floor to the cleansing section substantially perpendicularly disposed relative to the shaft, at least one exhaust communicating with the floor, an inlet for dust laden air to enter the cleansing section of the chamber, an outlet for cleansed air to leave the reservoir zone, a sweeper mechanism the arm or arms of which sweep over the floor as the shaft is rotated to urge the dust on the floor towards the exhaust port, and a blower unit at least portion of which is rotatable in the reservoir to reverse the flow of air through the bag walls sequentially, thereby to dislodge dust for gravitational movement towards the floor.

2. The dust collector claimed in claim 1 in which the blower unit includes an element defining air outlet ports for leading air sequentially into the bags.

3. The dust collector claimed in claim 2 in which the element is a manifold arm projecting from a housing mounted on the shaft and rotatable therewith, the housing accommodating an independently driven blower which acts to draw supplies of air from the reservoir zone.

4. The dust collector claimed in claim 3 in which the reservoir is closed by a cap which acts as a foundation for a blower motor.

5. The dust collector claimed in claim 4 in which the shaft is driven by a motor coupled directly or indirectly to a portion of the shaft projecting through the floor of the cleansing section.

6. The dust collector claimed in claim 2 in which the element is a turn-table mounted for rotation on the shaft and which together with a stationary hood defines a receiver for air delivered by a blower, the floor of the turn-table defining the ports for air to pass into the bags.

7. The dust collector claimed in claim 6 in which the blower is located on the outside of the casing of the collector with ducts for drawing air from the reservoir zone for delivery to the receiver.

8. The dust collector claimed in claim 7 including a downwardly directed skirt surrounding the upper regions of the bags, fast with the underside of the dividing wall, and so located as to direct incoming dust laden air rotationally and downwardly into the section before moving into engagement with the bags.

* * * * *